Patented July 7, 1931

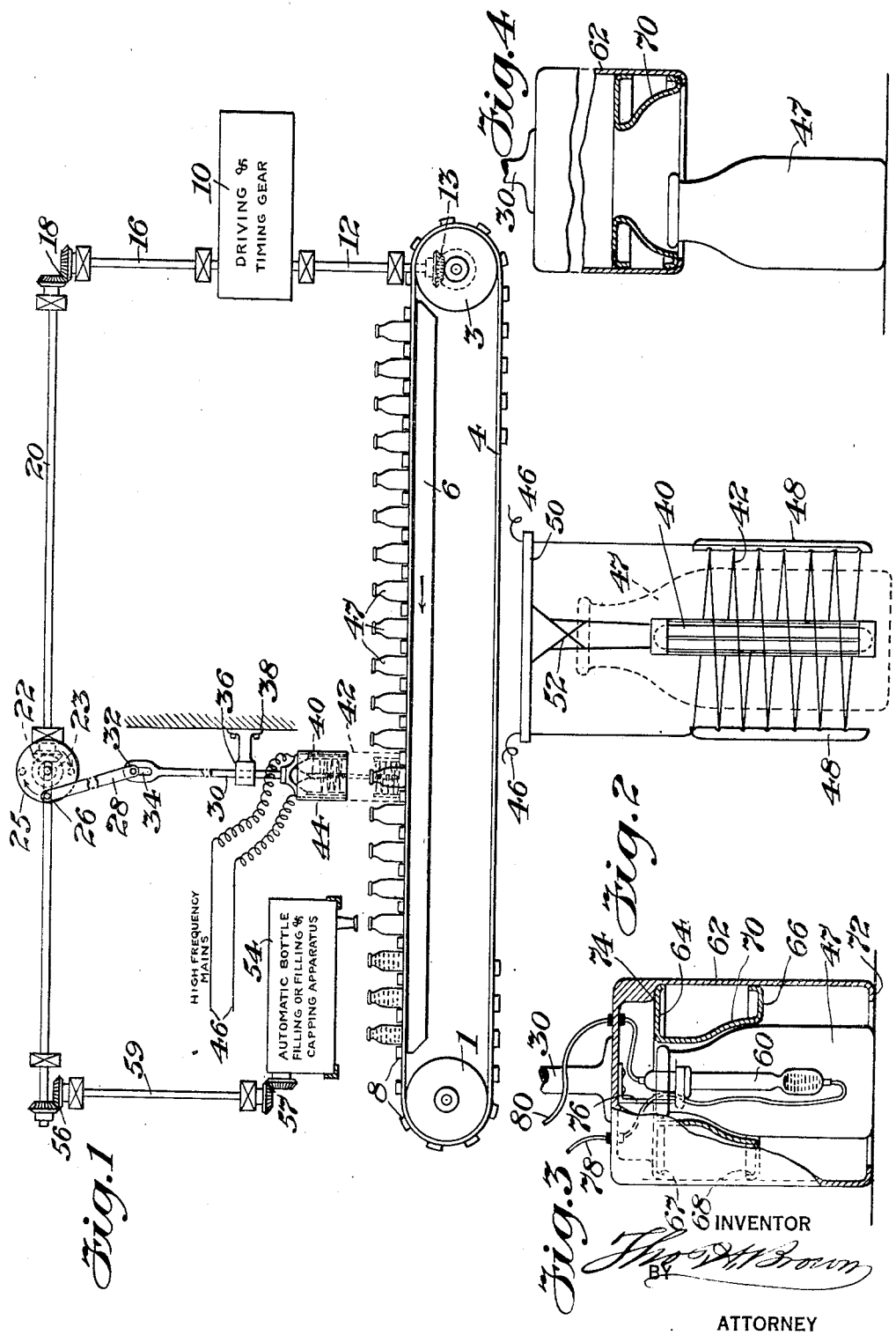

1,813,021

UNITED STATES PATENT OFFICE

THOMAS H. BROWN, OF CHATHAM, NEW JERSEY, ASSIGNOR TO GENERAL ELECTRIC VAPOR LAMP COMPANY, OF HOBOKEN, NEW JERSEY, A CORPORATION OF NEW JERSEY

STERILIZING SYSTEM

Application filed December 11, 1926. Serial No. 154,161.

The present invention relates to apparatus and a process for sterilizing bottles and other containers and for handling them to automatically bring the sterilizing means and the empty containers together and to separate them after the sterilizing action. The invention more particularly relates to means for sterilizing the interior of containers by means of radiation rich in ultra violet rays. The invention further relates to apparatus and a process for sterilizing containers by means of ultra violet radiation and for filling or filling and closing such containers immediately after they are sterilized. The invention is described as applied to the sterilizing and filling and capping of milk bottles but is applicable for use in the arts generally, particularly where glass, or similar, containers are used as receptacles for pasteurized, sterilized, or other processed goods, to insure that the container itself is sterile.

Various objects and advantages of the invention will be obvious from the following particular description of forms of apparatus embodying the invention or from an inspection of the accompanying drawings; and the invention also consists in certain new and novel features of construction and combinations of parts hereinafter set forth and claimed.

In the accompanying drawings there is shown for purposes of illustration one form of apparatus with certain modifications thereof embodying the invention, in which Fig. 1 is a diagrammatic view in elevation of a device embodying the invention, Fig. 2 is an elevation view showing diagrammatically details of the invention and Figs. 3 and 4 are diagrammatical views in part section showing further details of the invention.

The invention is particularly adapted to the packaging of various classes of goods which it is important to distribute to the trade in as sanitary condition as possible, such as foods, medicines and toilet preparations. These classes of goods are mainly shipped in small packages, and it is generally desirable to ship them in packages, or containers, which have been filled while dry and sterile. The container material may be glass, porcelain, clay, or the special cardboard packages designed to be impervious to dust and moisture. The invention is described in detail as applied to the distribution of milk, but it is understood that such an application of the apparatus and process is only illustrative, and that any product, such as those indicated above, which admits of considerable sub-division for distribution to the trade, may advantageously be substituted for milk, and analogous apparatus and methods used.

In Figs. 1 and 2 of the drawings a pair of pulleys or rolls 1 and 3 carry an endless belt conveyor 4 which moves or slides over a supporting table 6 and carries the spacing members 8. In place of the belt an endless chain of solid blocks linked together can be used. A driving apparatus or gear 10 acts through the shaft 12 and bevel gears 13 to drive conveyor 4 intermittently in steps and at a predetermined rate in a manner hereinafter fully described. Said driving apparatus 10 also drives a shaft 16 intermittently in steps in timed relation to said shaft 12. Through bevel gears 18 said shaft 16 drives a shaft 20 which is positioned over said belt 4 which carries a bevel gear 22 which drives through bevel 23 a crank disc 25 having a crank pin 26. A rod 28 connects said pin 26 to a reciprocating rod 30 through a pin 32 on connecting rod 28 and slot 34 at the end of said rod 30 whereby a sliding or loose connection is made. A bearing 36 mounted to a fixed member or wall 38 guides said reciprocating rod 30 in its movement. At its lower end said rod 30 carries the high frequency mercury vapor quartz lamp 40 and the high frequency induction coil 42 therefor enclosed by the cylindrical casing 44 which is open at its lower end. The electric main 46, 46 serves to connect said coil 42 to a suitable source not shown of high frequency varying current, provision being made for movement of the electrical connection with said coil 42. Fig. 2 shows details of the lamp 40 and the coil 42 in operable relation for sterilizing a milk bottle, the lamp being positioned in the bottle and the coil encircling it outside in position to induce a discharge producing current in said lamp. The supporting strips 48, 48 for coil 42 are connected to the stretcher 50, diagrammatically shown in Fig. 2, by the said enclosing casing or cylinder 44 and rigid members 52 mount said lamp 40 to said member 50.

In Fig. 1 is also shown a bottle filling and capping machine 54 which is operated from said shaft 20 through the bevels 56 and 57 and the shaft 59 and which is mounted over said conveyor 4 to one side of said sterilizer lamp 40.

In the use and operation of the apparatus of Figures 1 and 2 the driving apparatus 10 by means of a series of gears and Geneva stop mechanism in a manner well known in the mechanical arts is made to drive said conveyor belt 4 in a counter clockwise direction in steps with a given period of rest between each step, and the lamp 40 and coil 42 with the rod 30 are caused to move downwardly toward the end of each step movement or at the beginning of the rest period until said casing 44 in which said lamp and coil are mounted is brought to rest in a position on or close to said conveyor 4. The casing 44 with its lamp and coil are left in this rest position for a given period and are then through the same driving means lifted from the rest position to a distance high enough to permit the passage thereby of a bottle or container positioned on said conveyor 4 before the next step of motion of said conveyor 4 commences. As the conveyor 4 is driven in a step by step motion a continued series of containers or bottles such as the milk bottles 47 are placed thereon for conveyance to and presentation to said sterilizing means, a set of spacers such as the blocks 8, 8 serving to properly predetermine the position of each bottle so that each one successively is brought to rest under said lamp 40 in turn in order that the lamp 40 can enter the bottle while the coil 42 takes a position about the bottle for the sterilization thereof. The time of rest of the lamp 40 and coil 42 in operative relation to each bottle in turn is predetermined to insure the complete sterilization of the bottle by the ultra violet rays from the lamp. This sterilization is effected at room temperature, and without the slightest danger of breaking the bottles in a fraction of the time a heat sterilization process would necessitate; furthermore, the process described is certain, a properly energized quartz tube will supply radiation which is one of the most powerful germicides known. The bottles in turn can be filled and capped by the filling and capping apparatus 54 conventionally shown and of a type well known in the arts. The table 6 under the belt conveyor 4 serves as a rigid support for the bottles during their treatment and filling or capping.

Fig. 3 shows an arc type of lamp 60 which can be used in place of the lamp 40 for producing the ultra violet radiation. In either case the lamps are the well known types in which the envelope is of fused quartz or other suitable material transparent to ultra violet light. Figs. 3 and 4 show also a casing 62 in place of the casing 44 above described. This casing 62 carries centering means for the bottles 47 which comprises a pair of spaced apart disc members 64 and 66 and inwardly turned bearing flanges 67 and 68 having an outside diameter suitable for a sliding fit with the inside of said casing 62. Between the members 64 and 66 is mounted the centering funnel 70 having a contour closely resembling the contour at the top of a bottle or container to be handled by the apparatus. As shown this shape is made to suit the neck of a milk bottle. An inturned annular shoulder 72 at the bottom of said casing 62 serves as a lower stop for said funnel 70 and a corresponding upper shoulder 74 serves as an upper stop therefor. The bracket 76 supports said fused quartz envelope mercury vapor arc lamp 60 centrally inside said casing 62 and the leads 78 and 80 serve to connect the lamp to a suitable source of current not shown. In Fig. 4 the centering funnel 70 is shown at the bottom position which it occupies when the lamp and casing are lowered down onto the bottle and in Fig. 3 said funnel is shown as having been raised to the top of the casing by the bottle 47 over which the casing has been lowered. This centering device although not indispensable serves to properly center the bottle with respect to the lamp and is of particular utility for use with bottles or other containers having comparatively narrow necks. The bottles are placed on the conveyor in an approximately accurate position and misplacements due to slight variation therefrom and to variations in size of the bottle with respect to the positioning means (the blocks 8, 8 for example) are taken care of. The funnel as it moves up the sides of the casing tends to slide the bottle over to a centered position if it is off center.

From the above description of the application of the invention to the packaging of one food product it will be seen that an important feature resides in utilizing the considerable mass sub-division of the old packaging systems to permit of a very effective sterilization of the separate empty containers, before filling them, and that this new step can be carried out at room temperature, in a clean dry atmosphere without in any way interfering with the usual operations of packaging.

While I have shown and described and have pointed out in the annexed claim certain novel features of the invention, it will be understood that various omissions, substitutions and changes in the forms, parts and details of the device illustrated and in its operation may be made by those skilled in the art without departing from the spirit of the invention.

The form of the invention disclosed in Figs. 3 and 4 is claimed in Patent 1,788,906 of date Jan. 13, 1931.

I claim:

In a bottle sterilizing apparatus, an induction type mercury vapor lamp and a high frequency coil therefor, said lamp being of a size suitable for insertion into a bottle and said coil of a size suitable for movement to a position about a bottle, and means for conveying a succession of bottles to and away from said lamp and coil and for moving said lamp and coil into operable relation respectively in and about each bottle successively as it is presented thereto and for moving the lamp and coil from such operative relation therewith, before it is moved away.

Signed at Hoboken in the county of Hudson and State of New Jersey this 9 day of December, A. D. 1926.

THOS. H. BROWN.